United States Patent
Birnbrich et al.

(10) Patent No.: US 8,598,243 B2
(45) Date of Patent: Dec. 3, 2013

(54) MACROPORE-CONTAINING POLYMER FOAMS AS INSULATION MATERIALS

(75) Inventors: Paul Birnbrich, Sollngen (DE); Hans-Josef Thomas, Korschenbroich (DE); Dagmar Stahlhut-Behn, Düsseldorf (DE); Gilbert Schenker, Erkrath (DE)

(73) Assignee: Cognis IP Management GmbH, Duesseldord (DE)

( * ) Notice: Subject to any disclaimer, the term of this patent is extended or adjusted under 35 U.S.C. 154(b) by 203 days.

(21) Appl. No.: 13/173,939

(22) Filed: Jun. 30, 2011

(65) Prior Publication Data

US 2012/0010310 A1 Jan. 12, 2012

(30) Foreign Application Priority Data

Jul. 8, 2010 (EP) .................................... 10168828

(51) Int. Cl.
*B29C 67/20* (2006.01)
*C08L 63/00* (2006.01)
*C09J 9/00* (2006.01)
*E04B 1/82* (2006.01)

(52) U.S. Cl.
USPC ............... 521/65; 252/62; 264/46.6; 521/135

(58) Field of Classification Search
None
See application file for complete search history.

(56) References Cited

U.S. PATENT DOCUMENTS

| 4,828,771 | A | * | 5/1989 | Kishima et al. ................. 264/41 |
| 7,300,963 | B2 | | 11/2007 | Birnbrich et al. |
| 2010/0125109 | A1 | * | 5/2010 | Birnbrich et al. ............ 521/178 |
| 2010/0127204 | A1 | | 5/2010 | Birnbrich et al. |
| 2013/0062551 | A1 | * | 3/2013 | Birnbrich et al. ............... 252/62 |

FOREIGN PATENT DOCUMENTS

| CA | 1318089 | 5/1993 |
| DE | 3728846 | 3/1989 |
| EP | 1518875 | 3/2005 |
| EP | 2186842 | 5/2010 |

* cited by examiner

*Primary Examiner* — Robert Sellers
(74) *Attorney, Agent, or Firm* — Servilla Whitney LLC

(57) ABSTRACT

Polymer foams comprising macropores, the macropores having average cross sections of above 500 nm, are obtainable by reacting one or more epoxy resins with one or more amphiphilic epoxy resin hardeners in water in a phase inversion polymerization, where, during the phase inversion polymerization, but after phase inversion has taken place, a volume increase of the internal voids which form initially, and which are present predominantly as micropores having average cross sections of below 500 nm, is induced such that the fraction of the macropores—relative to the entirety of micropores and macropores present in the polymer foam—at the end of the phase inversion polymerization is above 50% by volume. Polymer foams of the present invention are suitable for use as acoustic insulation materials in means of transport and in industrial and plant construction.

20 Claims, No Drawings

MACROPORE-CONTAINING POLYMER FOAMS AS INSULATION MATERIALS

CROSS-REFERENCE TO RELATED APPLICATIONS

This application claims the benefit of priority under 35 U.S.C. §119(a) to European Patent Application No. 10168828.1, filed Jul. 8, 2010, which is hereby incorporated by reference in its entirety.

FIELD OF THE INVENTION

The invention relates to specific macropore-containing polymer foams and to the use thereof as acoustic insulation materials.

BACKGROUND

Polymeric epoxy resins have been known for a long time. As a general rule they are prepared by reacting polyepoxides having on average at least two terminal or lateral epoxide groups per molecule with hardeners, more particularly aminic hardeners, which are diamines or polyamines. These polymeric epoxy resins have diverse fields of application, predominantly their use as paints and coating materials (e.g., application of a topcoat to a substrate).

EP-A-1,518,875 describes special hardeners for water-based epoxy resin systems, these hardeners being obtainable by reacting a mixture of (a) at least one epoxidized polyalkylene oxide, selected from the group consisting of epoxidized polyethylene oxides, epoxidized polypropylene oxides, and polyethylene-propylene oxides, (b) at least one epoxidized aromatic hydroxy compound selected from the group consisting of bisphenol A epoxides and bisphenol F epoxides, and (c) at least one aromatic hydroxy compound selected from the group consisting of bisphenol A and bisphenol F to give an intermediate and subsequently reacting this intermediate with a polyamine. Also disclosed is the use of these hardeners for producing transparent varnishes and coating materials (application of a topcoat to a substrate, for floor coatings, for example).

Porous absorbents have long been known in their capacity as sound-damping materials. This effect is based on absorption of the sound waves in the open-cell pore structure, and conversion of the sound energy into heat energy. Conventional porous absorbents are more effective and more broad-spectrum in their effect as the frequency increases, and therefore are more often used for damping moderate to relative high frequencies. The sound-damping effect is expressed by the sound absorption coefficient ($\alpha 0$), which is determined by measurement in an impedance tube (Kund tube) in accordance with ISO 10534. Here, a value of 1.0 denotes that all of the sound waves are absorbed at the frequency in question; a value of 0.5 corresponds, accordingly, to a reduction in the sound level of the frequency in question by half.

SUMMARY OF THE INVENTION

One embodiment of the present invention relates to a polymer foam comprising macropores, the macropores having average cross sections of above 500 nm, obtainable by reacting one or more epoxy resins with one or more amphiphilic epoxy resin hardeners in water in a phase inversion polymerization, where, during the phase inversion polymerization, but after phase inversion has taken place, a volume increase of the internal voids which form initially, and which are present predominantly as micropores having average cross sections of below 500 nm, is induced such that the fraction of the macropores—relative to the entirety of micropores and macropores present in the polymer foam—at the end of the phase inversion polymerization is above 50% by volume.

Another embodiment of the present invention relates to a polymer foam comprising macropores, the macropores having average cross sections of above 500 nm, obtainable by reacting one or more epoxy resins with one or more amphiphilic epoxy resin hardeners in water in a phase inversion polymerization, where, during the phase inversion polymerization, but after phase inversion has taken place, a volume increase of the internal voids which form initially, and which are present predominantly as micropores having average cross sections of below 100 nm, is induced such that the fraction of the macropores—relative to the entirety of micropores and macropores present in the polymer foam—at the end of the phase inversion polymerization is above 50% by volume.

Yet another embodiment of the present invention relates to a polymer foam wherein epoxy resin hardeners used to produce the polymer foam are hardeners obtainable by reacting a mixture comprising at least one epoxidized polyalkylene oxide, selected from the group of epoxidized polyethylene oxides, epoxidized polypropylene oxides, and polyethylene-propylene oxides, at least one epoxidized aromatic hydroxy compound selected from the group of bisphenol A epoxides and bisphenol F epoxides, and at least one aromatic hydroxy compound selected from the group of bisphenol A and bisphenol F to give an intermediate, and then reacting this intermediate with a polyamine.

In one embodiment of the present invention the volume increase to produce the polymer foam is induced, during the phase inversion polymerization, but after phase inversion has taken place, by activating a foaming agent and/or heating a liquid medium present in the system to above its boiling point. The liquid medium may be the water present in the system. The foaming agent may be hydrogen peroxide or an organic peroxide.

In one or more embodiments of the present invention, diethylenetriamine may used as polyamine; epoxidized polypropylene oxides may be used as at least one epoxidized polyalkylene oxide; and bisphenol A epoxides may used as at least one epoxidized aromatic hydroxyl compound.

Another embodiment of the present invention relates to a method for acoustic insulation comprising providing polymer foam and using the polymer foam as an acoustic insulation material in a transport, industrial, or plant construction application.

Another embodiment of the present invention relates to a method for producing polymer foams having macropores with average cross sections of above 500 nm comprising: reacting one or more epoxy resins with one or more amphiphilic epoxy resin hardeners in water in a phase inversion polymerization reaction, and inducing a volume increase of the internal voids of the micropores which form initially to produce macropores with average cross sections of above 500 nm for a period of time such that the fraction of the macropores at the end of the phase inversion polymerization is above 50% by volume relative to the entirety of micropores and macropores present in the polymer foam.

Another embodiment of the present invention relates to a method for producing an epoxy resin hardeners comprising reacting a mixture comprising at least one epoxidized polyalkylene oxide, at least one epoxidized aromatic hydroxy compound and at least one aromatic hydroxy compound the group of bisphenol A and bisphenol F to produce an intermediate; reacting said intermediate with a polyamine. The at least one epoxidized polyalkylene oxide may be selected from the group consisting of epoxidized polyethylene oxides, epoxidized polypropylene oxides, and polyethylene-propylene oxides. The at least one epoxidized aromatic hydroxy compound may be selected from the group consisting of bisphenol A epoxides and bisphenol F epoxides. The at least one aromatic hydroxy compound may be selected from the group consisting of bisphenol A and bisphenol F.

One or more embodiments of the present invention relates to a method for producing polymer foams having macropores with average cross sections of above 500 nm wherein the step of inducing a volume increase during the phase inversion polymerization, but after phase inversion has taken place comprises activating a foaming agent or heating a liquid medium present in the system to above its boiling point. The foaming agent may be hydrogen peroxide or an organic peroxide.

DETAILED DESCRIPTION

Sound insulation is understood typically to be the prevention of sound propagation by components (e.g., walls, ceilings), in other words the reduction in sound transmission into adjacent spaces. By sound absorption is meant the damping of space acoustics through absorption of sound waves. The terms "sound insulation" and "sound absorption", however, cannot be understood as strict opposites, since they are focused on different key topical points. For the purposes of the present invention, the neutral expression "acoustic insulation" is used, which includes both aspects, namely sound insulation and sound absorption. Acoustic insulation materials, then, are those materials which are capable of having a sound-damping and/or sound-absorbing effect.

An embodiment of the present invention provides materials suitable as acoustic insulation materials. These materials in this case ought more particularly to have a sound-damping effect. In this case, the sound-damping effect may extend more particularly to the entire frequency range accessible to the human ear or to only part of this frequency range. Moreover, the acoustic insulation materials intended in accordance with the invention ought to have a low thermal conductivity (preferably below 0.09 W/m*K) and high mechanical strength (maximum compressive tension preferably above 1.0 MPa).

The present invention first provides a polymer foam comprising macropores, the macropores having average cross sections of above 500 nm, obtainable by reacting one or more epoxy resins with one or more amphiphilic epoxy resin hardeners in water in a phase inversion polymerization, where, during the phase inversion polymerization, but after phase inversion has taken place, a volume increase of the internal voids which form initially, and which are present predominantly as micropores having average cross sections of below 500 nm—and preferably of below 100 nm—is induced such that the fraction of the macropores—relative to the entirety of micropores and macropores present in the polymer foam—at the end of the phase inversion polymerization is above 50% by volume.

The polymer foams of the invention are polymers which have inner voids. These polymers are spongelike structures which contain macropores. The macropores have average cross sections which are above 500 nm and more particularly above 750 nm. As well as the macropores, the polymer foams may also have micropores, but the macropores are dominant in volume terms. The micropores have average cross sections in the range from 10 to 500 nm and more particularly from 10 to 100 nm. The fraction of the macropores—based on the entirety of micropores and macropores—in accordance with the invention is preferably above 50 percent by volume and more particularly above 75 percent by volume.

Further provided by the invention is the use of a polymer foam comprising macropores, the macropores having average cross sections of above 500 nm, obtainable by reacting one or more epoxy resins with one or more amphiphilic epoxy resin hardeners in water in a phase inversion polymerization, where, during the phase inversion polymerization, but after phase inversion has taken place, a volume increase of the internal voids which form initially, and which are present predominantly as micropores having average cross sections of below 500 nm—and preferably of below 100 nm—is induced such that the fraction of the macropores—relative to the entirety of micropores and macropores present in the polymer foam—at the end of the phase inversion polymerization is above 50% by volume, as acoustic insulation material in means of transport and in industrial and plant construction.

As stated above, the inventive use is geared to acoustic insulation in means of transport and in industrial and plant construction. Examples of means of transport are, for instance, automobiles, boats, aircraft, rail vehicles, and the like. Examples of industrial and plant construction are, for instance, vessels, boilers, pipelines, heating systems, solar systems, and the like.

The polymer foams for use in accordance with the invention are notable, further to the acoustic insulation properties, for low thermal conductivity in conjunction with high mechanical strength.

The Phase Inversion Polymerization (PIP)

Phase inversion polymerization (PIP) means the following: first of all an aqueous emulsion of the epoxy resin (E) in water is prepared, the amphiphilic epoxy resin hardener (H) functioning as emulsifier. This system—also referred to below as reaction system—is initially addressed as an oil-in-water emulsion (O/W emulsion). The oil component of this O/W emulsion is of course the epoxy resin (E).

In the course of the following reaction of resin and hardener (curing in the sense of a polyaddition) there is a phase inversion (phase reversal), i.e. the reaction system changes from an emulsion of type O/W to an emulsion of type W/O, in which water, as the internal phase, is surrounded by the curing polymer. The reason for this is that, in the course of curing, the original emulsifier properties of the hardener undergo change, since the nature of the hardener is transformed, by polyaddition, in the direction of increasing hydrophobicity. The phase inversion is generally associated with a marked increase in viscosity of the emulsion and is therefore easily recognizable.

Following complete curing, then, there is a porous polymer matrix present with the water phase contained in its cavities. The water phase can be removed, if desired, by drying, to give air-filled cavities.

A necessary condition for a phase inversion polymerization to take place is that no water can escape from the reaction system. From a technical standpoint this can be realized in a variety of ways.

First, the reaction system can be introduced into a closed mold. It is also possible to introduce the reaction system into an open system and then to ensure, for example, that (a) sufficient atmospheric humidity prevails at the interface with the gas phase (usually surrounding air), and prevents dryout or water loss from the top layer of the reaction system, or that (b) the interface with the gas phase is covered, by a film, for example.

Whereas the versions of the implementation of the PIP described so far are, so to speak, loss-free embodiments, there is a further version of the PIP implementation in which, although the reaction system is introduced into an open system, no particular measures are taken to prevent water loss of the boundary layer to the gas phase. In this case, water loss in this boundary layer forms a dense, chemical-resistant structure (which can be addressed as a clear coat), which forms a water barrier for the underlying part of the reaction system, with the consequence that the PIP can take place unhindered in said structure. Following complete curing of the reaction system, the dense, chemical-resistant layer (which is generally 0.1 to 0.3 mm thick) can be eliminated by mechanical removal.

In one preferred embodiment the PIP is carried out such that epoxy resin (E) and hardener (H) are used in an equivalent ratio of 2:1 to 1:2. In this context, (E) to (H) equivalent ratios of 1:1 are particularly preferred.

The PIP is characterized by an introductory phase, in which an O/W emulsion is present, and a curing phase, which begins with formation of the W/O emulsion. It can also be said that the PIP has two time windows which are differentiated by the respective type of emulsion present. In time window TW1, an O/W emulsion is present; in time window TW2, a W/O emulsion is present. The break between the two time windows is the phase inversion procedure. The PIP may be carried out at 0% to 100% atmospheric humidity. The water content of the PIP reaction system can be varied in the range from 95 to 20% by weight (based on the overall reaction system).

If desired it is also possible to add thickeners to the reaction system.

The reaction system can be cured in a broad temperature range, preferably between 1° C. and 99° C. and more particularly between 5° C. and 60° C.

In contrast to the customary methods of producing polymer foams, it is also possible to add fillers to the PIP reaction systems. Through the use of selected fillers it is possible to carry out further modification not only to the mechanical properties, such as compressive strength, flexural strength, elasticity modulus, and density, but also to the thermal conductivity of the polymer foams of the invention.

The Induction of the Volume Increase

The phase inversion polymerization (PIP) described in more detail above has two time windows, namely TW1 and TW2. In time window TW1, an O/W emulsion is present. This is followed by a phase inversion. In time window TW2, a W/O emulsion is then present. For the understanding of the present invention it is important that the intended volume increase is induced during time window TW2. The intended volume increase therefore takes place during the phase inversion polymerization, and within the time window TW2 therein.

The way in which the volume increase is induced is not critical per se in the context of the present invention.

In one embodiment, the volume increase is induced by activating a foaming agent during the phase inversion polymerization, but after phase inversion has taken place. Foaming agents that are contemplated include, quite generally, all substances capable of bringing about an internal volume increase in the course of the phase inversion polymerization by releasing a gas in an alkaline medium (pH range of 7.5-14). Examples of suitable foaming agents are as follows: hydrogen peroxide and organic hydroperoxides. The amount of the foaming agent is preferably in the range from 0.1% to 10% by weight and more particularly 0.5% to 5% by weight, based in each case on the entirety of the solids present in the emulsion. The foaming agent may be metered in even before, or during, the time window TW1.

In one embodiment, the volume increase is induced by heating a liquid medium present in the system to above its boiling point during the phase inversion polymerization, but after phase inversion has taken place.

This liquid medium may be metered into the system in the form, for instance, of an organic solvent, preferably one having a boiling point of below 100° C.

In one particular preferred embodiment, the liquid medium is the water which is present in any case in the system; in this case the volume increase is brought about by heating the system in time window TW2 to temperatures of above 100° C. By selecting the amount of water in the system, the temperature in time window TW2, and the time point of the temperature increase, the polymer foam can be modified in terms of its inner void structure.

The two modes of induction of volume increase described in more detail above may be used individually or simultaneously.

The Epoxy Resins (E)

The epoxide compounds (E) are polyepoxides having on average at least two terminal or lateral epoxide groups per molecule. These epoxide compounds may be either saturated or unsaturated, and may be aliphatic, cycloaliphatic, aromatic or heterocyclic, and may also contain hydroxyl groups. They may, furthermore, include substituents which do not give rise to any disruptive side reactions under the conditions of mixing and of reaction, such as alkyl or aryl substituents, ether moieties, and the like.

These epoxide compounds are preferably polyglycidyl ethers based on polyhydric, preferably dihydric, alcohols, phenols, hydrogenation products of these phenols, and/or on novolaks (reaction products of monohydric or polyhydric phenols with aldehydes, especially formaldehyde, in the presence of acidic catalysts).

The epoxide equivalent weights of these epoxide compounds are preferably between 85 and 3200, more particularly between 170 and 830. The epoxide equivalent weight of a substance is defined as the amount of the substance (in grams) which contains 1 mol of oxirane rings.

Polyhydric phenols contemplated are preferably the following compounds: resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3-dimethyldiphenylpropane, 4,4'-dihydroxybiphenyl, 4,4'-dihydroxybenzophenol, 1,1-bis(4-hydroxyphenyl)ethane, 1,1-bis(4-hydroxyphenyl)-isobutane, bis(4-hydroxyphenyl)methane, bis(4-hydroxy-phenyl)ether, bis(4-hydroxyphenyl) sulfone, etc. and also the chlorination and bromination products of the aforementioned compounds; bisphenol A is especially preferred here.

Also suitable as compounds (E) are the polyglycidyl ethers of polyhydric alcohols. Examples of such polyhydric alcohols include ethylene glycol, diethylene glycol, triethylene glycol, 1,2-propylene glycol, polyoxypropylene glycols (n=1-20), 1,3-propylene glycol, 1,4-butylene glycol, 1,5-pentanediol, 1,6-hexanediol, 1,2,6-hexanetriol, glycerol, isosorbide, and 2,2-bis(4-hydroxycyclohexyl)propane.

It is also possible to use polyglycidyl ethers of polycarboxylic acids as compounds (F), obtained by the reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid, and dimerized linolenic acid. Examples are diglycidyl adipate, diglycidyl phthalate, and diglycidyl hexahydrophthalate.

It is also possible to use mixtures of two or more epoxide compounds (E).

In the production of the inventive polymer foams, it is possible, optionally, for additional processing auxiliaries and/or adjuvants that are well known to the skilled person to be used. Examples of such are pigments, deaerating agents, defoamers, dispersing assistants, antisettling agents, accelerants, free amines, flow control additives, and conductivity improvers.

The Epoxy Resin Hardeners (H)

Amphiphilic epoxy resin hardeners (H) are those epoxy resin hardeners which have hydrophilic and hydrophobic structural elements.

Preference is given to using those amphiphilic epoxy resin hardeners which are self-emulsifying in water at 25° C. and which, moreover, are capable of emulsifying epoxy resins (E) in water at 25° C.

It is preferred to use those hardeners (H*) which are obtainable by reacting a mixture comprising
(A) at least one epoxidized polyalkylene oxide, selected from the group consisting of epoxidized polyethylene oxides, epoxidized polypropylene oxides, and polyethylene-propylene oxides,
(B) at least one epoxidized aromatic hydroxy compound selected from the group consisting of bisphenol A epoxides and bisphenol F epoxides, and
(C) at least one aromatic hydroxy compound selected from the group consisting of bisphenol A and bisphenol F
to give an intermediate (Z), and then reacting this intermediate with a polyamine (P).

In one embodiment exclusively components (A), (B) and (C) are reacted to give the intermediate (Z), which is further reacted with a polyamine (P).

In another embodiment, the intermediate (Z) that is subsequently reacted with the polyamines (P) to give the hardener is prepared using not only compounds (A), (B) and (C) but also compounds (D). The compounds (D) are compounds selected from the group consisting of the triglycidyl ethers of triols and the diglycidyl ethers of diols. Examples of suitable diols and triols on which the compounds (D) are based include, but are not limited to, the following: ethylene glycol, diethylene glycol, triethylene glycol, 1,2-propylene glycol, 1,3-propylene glycol, 1,4-butylene glycol, 1,5-pentanediol, 1,6-hexanediol, cyclohexanediol, cyclohexanedimethanol, neopentylglycol, 1,2,6-hexanetriol, glycerol, and trimethylolpropane.

The Compounds (A)

Epoxidized polyethylene oxides in the context of the invention are compounds which are obtainable by converting the two terminal OH groups of polyethylene oxide into oxirane groups, by means, for example, of reaction with epichlorohydrin. The polyethylene oxide used here may have an average molar weight in the range from 80 to 3000; it can be prepared by starting the polymerization of the ethylene oxide on an alkylene diol with C2-C18 in the manner known to the skilled person.

Epoxidized polypropylene oxides in the context of the invention are compounds which are obtainable by converting the two terminal OH groups of polypropylene oxide into oxirane groups, by means, for example, of reaction with epichlorohydrin. The polypropylene oxide used here may have an average molar weight in the range from 110 to 3000; it can be prepared by starting the polymerization of the propylene oxide on an alkylene diol with C2-C18 in the manner known to the skilled person.

Polyethylene-propylene oxides in the context of the invention are compounds which are obtainable by converting the two terminal OH groups of polyethylene-propylene oxide into oxirane groups, by reaction, for example, with epichlorohydrin. The polyethylene-propylene oxide used here may have an average molar weight in the range from 80 to 3000. By polyethylene-propylene oxide is meant compounds which are obtainable by copolymerization of ethylene oxide and propylene oxide, in which case the polymerization of the two reactants can be carried out simultaneously or blockwise, the polymerization of the propylene oxide and/or of the ethylene oxide being started on an alkylene diol of C2-C18 in the manner known to the skilled person.

The compounds (A) can be used individually or in a mixture with one another.

The Compounds (B)

Bisphenol A epoxides are understood in the context of the invention, as in the generally customary manner, as being compounds which are obtainable by reacting bisphenol A with epichlorohydrin and/or polymerizing the latter by further reaction with bisphenol A. These compounds are therefore also known under the designation bisphenol A diglycidyl ethers or, generally, as Bisphenol A epoxy resins. Commercial products are Epikote 828, 1001, 1002, 1003, 1004, etc. from Shell.

The molecular weights of the bisphenol A epoxides used are preferably in the range from 380 to 3000.

Bisphenol F epoxides are understood in the context of the invention, as in the generally customary manner, as being compounds which are obtainable by reacting bisphenol F with epichlorohydrin and/or polymerizing by further reaction with bisphenol F. These compounds are therefore also known under the designation bisphenol F diglycidyl ethers or, generally, as bisphenol F epoxy resins.

The molecular weights of the bisphenol F epoxides used are preferably in the range from 350 to 3000.

The compounds (B) can be used individually or in a mixture with one another.

The Compounds (C)

Bisphenol A is well known to a skilled person and is characterized by the following formula:

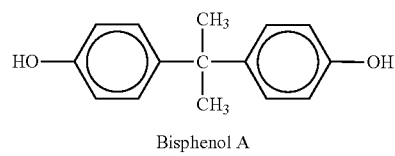

Bisphenol A

Bisphenol F is likewise well known to the skilled person.

The compounds (C) can be used individually or in a mixture with one another.

The Compounds (P)

Polyamines (P) employed in the context of the present invention are primary and/or secondary amines having at least two nitrogen atoms and at least two active amino hydrogen atoms per molecule. Aliphatic, aromatic, aliphatic-aromatic, cycloaliphatic, and heterocyclic diamines and polyamines can be utilized. Examples of suitable polyamines (P) are as follows: polyethylenamines (ethylenediamine, diethylenetriamine, triethylenetetramine, tetraethylenepentamine, etc.), 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pent-anediamine, bis(3-aminopropyl)amine, N,N'-bis(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethyl-piperazines, the poly(alkylene oxide) diamines and triamines (such as, for example, Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001), meta-xylylenediamine, phenylene-diamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexylmethane, 1,3-bis(aminomethyl)cyclohexane, the mixture of poly(cyclohexyl-aromatic)amines linked via a methylene bridge (also known as MBPCAAs), and polyaminoamides. Polyethylenamines, more particularly diethylenetriamine, are particularly preferred.

The compounds (P) can be used individually or in a mixture with one another.

The Preparation of the Intermediate (Z)

As stated above, the hardeners (H*) may be obtained by reacting a mixture comprising the compounds (A), (B) and (C) initially to form an intermediate (Z) which is then reacted with the polyamine (P). In one embodiment the intermediate is prepared using the compounds (A) and (B) in a molar ratio of 0.1:1 to 5:1.

In one embodiment, in the preparation of the intermediate, a molar ratio of the sum of the compounds (A) and (B) (these compounds each contain two oxirane groups per molecule) to compound C (this compound contains two OH groups per molecule) in the range from 1.1:1 to 10:1 is set. This is synonymous with setting the equivalent ratio of oxirane rings in the sum of the compounds (A) and (B) to reactive hydrogen atoms of the compound (C) at a level in the range from 1.1:1 to 10:1.

In a further embodiment, namely in cases where at least one compound (D) is used as well in the course of the preparation of the hardener (H*), in the preparation of the intermediate, a molar ratio of the sum of the compounds (A), (B) and (D) (these compounds each contain two oxirane groups per molecule) to compound C (this compound contains two OH groups per molecule) in the range from 1.1:1.0 to 10.0:1.0 is set. This is synonymous with setting the equivalent ratio of oxirane rings in the sum of the compounds (A), (B) and (D) to reactive hydrogen atoms of the compound (C) at a level in the range from 1.1:1.0 to 10.0:1.0.

On this point, for the sake of clarity, the following elucidation is made: the expression "equivalent ratio" is familiar to the skilled person. The fundamental idea behind the concept of the equivalent is that, for each substance involved in a reaction, consideration is given to the reactive groups involved in the target reaction. The stating of an equivalent ratio then expresses the numerical ratio between the entirety of the reactive groups in the compounds (x) and (y) that are used. In this context it must be borne in mind that a reactive group is understood to be the smallest possible reactive group—the concept of the reactive group, therefore, is not congruent with the concept of the functional group. In the case of H-acidic compounds, for instance, this means that, while OH groups or NH groups constitute such reactive groups, $NH_2$ groups do not, there being two reactive H atoms located on the same nitrogen atom. Here, rationally, within the functional group $NH_2$, the two hydrogen atoms are considered to be a reactive group, and so the functional group $NH_2$ contains two reactive groups, namely the hydrogen atoms.

In one embodiment the intermediate is prepared in the presence of a catalyst, more particularly triphenylphosphine or ethyltriphenylphosphonium iodide. The amount of the catalyst in this case is about 0.01% to 1.0% by weight—based on the total amount of compounds (A), (B) and (C).

The epoxide number (% EpO) of the intermediate is preferably below 10% EpO, more particularly below <5% EpO. The definition of the epoxide number and the details of its analytical determination may be found in the example section of this specification.

The Preparation of the Hardener (H)

For the preparation of the hardener, as already stated, the intermediate (Z) is reacted with a polyamine (P).

In one embodiment the intermediate and the polyamine (P) are used in amounts such that the equivalent ratio of the reactive H atoms on the aminonitrogen atoms of (P) to the oxirane groups in the intermediate compound is in the range from 4:1 to 100:1.

The reaction of the intermediate with the polyamine is preferably carried out by initially introducing the polyamine in excess, to ensure that essentially 1 molecule of the polyamine, preferably diethylenetriamine, reacts with each of the epoxide groups of the intermediate compound. Excess amine can be removed by distillation in order to minimize the free amine content.

EXAMPLES

Abbreviations

In the text below:
EEW=epoxide equivalent weight (as described above)
MW=average molecular weight
RPM=revolutions per minute
%=percent by weight, unless explicitly indicated otherwise
Raw Materials Used
Epoxy resin (E): Chem Res E20 (Cognis GmbH)
Hardeners (H): the following hardeners were prepared:

Hardener H1

44 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, and 0.1 g of triphenylphosphine. The resulting mixture was heated at 160° C. and stirred at that temperature for about 3.5 hours until the epoxide number was 3.95%. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 89.5 g of water, with thorough stirring.

This gave 205.6 g of a clear amber liquid having a viscosity (without solvent, Brookfield, 10 rpm, 40° C.) of 2140 mPas, a solids content of 60%, and an amine number of 134.

Use Examples

The examples below are to be understood as follows: Example 1 serves for comparison: in this case, no measures have been taken to induce a volume increase in time window TW2. Examples 2 and 3 are inventive. Here, in Example 2, a volume increase has been induced by means of hydrogen peroxide, and in Example 3 a volume increase has been induced by means of heating of the liquid medium, water, to above its boiling point—in each case in time window TW2 of the phase inversion polymerization.

Example 1

Epoxy resins (E) and hardeners (H) were introduced into a stirring vessel (diameter 95 mm, height 120 mm) and pre-emulsified using a Pendraulik LM34 stirrer on setting 1 (about 465 revolutions/minute). The amounts of (E) and (H) used can be seen in table 1. A homogeneous white coloration indicated corresponding homogenization. Subsequently the water was added in portions (the amount of water in each case is shown in table 1). The stirring speed was adjusted such that there was just no longer a thrombus formed. The total time from pre-emulsification to processing was approximately 7 minutes. The equivalent ratio of epoxy resin to hardener was 1:1. For curing, the completed emulsion was poured into a corresponding mold and, covered with aluminum foil, was cured in accordance with the details in the table.

Example 2

Emulsion preparation took place in the same way as in Example 1. Hydrogen peroxide was added to the completed emulsion as a foaming agent, as indicated in Table 1, with stirring, followed by homogenization for 2 minutes. For curing, the emulsion thus prepared was poured into a corresponding mold and, covered with aluminum foil, and was cured in accordance with the details in the table.

Example 3

Emulsion preparation took place in the same way as in Example 1. For curing, the completed emulsion was poured into a corresponding mold. The mold with the poured material was covered with aluminum foil and subjected to preliminary curing in a drying oven at 55° C. for 30 minutes. After this time, the poured material was already solid, and the phase inversion was already at an end; curing, however, was still not complete, i.e., the system was still situated in time window TW2 (see description above). The mold was then immediately introduced into a drying oven preheated to 120° C. As a result of this, the water in the pores was able to evaporate, and the gas pressure produced caused a volume increase on the part of the pores formed, and, at the same time, the further curing of the polymer. After a residence time of 30 minutes at 120° C., the mold was removed and then left to stand at 23° C. for 18 hours (afterdrying). The test specimen was removed from the mold and dried at 55° C. to constant mass.

Details relating to examples 1 to 3 can be taken from table 1, which also includes the measurement data on thermal conductivity, flexural strengths and compressive strengths of the polymer foams obtained.

Sample Preparation

To produce the test specimens for flexural and compressive strength measurements, corresponding silicone molds were used, coated with the release agent T3 (Ebalta). The sheets for the thermal conductivity measurement were produced in a Teflon mold coated with the release agent Loxiol G40 (Cognis). The casting compounds were covered, but not given an airtight seal, until demolding took place.

Thermal Conductivity Measurement

The thermal conductivity was measured in accordance with ISO 8301, corresponding to the thermal flux measurement method. The sheet dimensions were 150 mm×150 mm; the layer thickness varied between 20 mm and 25 mm. Measurement was carried out using a Netzsch HFM 436/3/1E apparatus; the applied pressure was 65 N. The measurement temperature chosen was 10° C., with a temperature difference of 20 K.

Determination of Flexural and Compressive Strengths

The flexural and compressive strengths were measured by methods based on DIN 53452 and 53454 respectively. Storage under standard conditions did not take place. The change in geometry of the specimens could not be predicted exactly, and was therefore disregarded. The measuring instrument used was an Instron 5565 universal testing machine with the Bluehill 2.0 software. The dimensions of the test specimens for the flexural tests were cuboids with 120 mm×10 mm×15 mm, while the compressive tests were carried out using cylindrical test specimens with dimensions of 27 mm height and 12 mm diameter. The testing speeds are given in the DINS.

TABLE 1

| | examples: | | |
|---|---|---|---|
| | Example 1 | Example 2 | Example 3 |
| Hardener H1 [g] | 160.0 | 117.0 | 117.0 |
| Epoxy resin Chem Res E20 [g] | 145.1 | 100.0 | 100.0 |
| Demineralized water [g] | 297.6 | 41.0 | 100.0 |
| Hydrogen peroxide, 35% strength | — | 2.0 | 0 |
| Binder content [%] | 40 | 63.0 | 53.7 |
| Drying temperature | 23° C. | 23° C. | 55° C./120° C. |
| Curing time | 168 h | 168 h | each 30 min |
| Density [g/cm$^3$] | 0.47 | n.d. | 0.38 |
| Thermal conductivity [W/m*K] | 0.05183 | n.d. | n.d. |
| Max. compressive tension Mean value [MPa] | 9.0 | n.d. | n.d. |
| Max. compressive tension Standard deviation [MPa] | 2.4 | n.d. | n.d. |
| Flexural elasticity | 99.4 | n.d. | n.d. |

TABLE 1-continued

| | examples: | | |
|---|---|---|---|
| | Example 1 | Example 2 | Example 3 |
| modulus Mean value [MPa] | | | |
| Flexural elasticity modulus Standard deviation [MPa] | 6.0 | n.d. | n.d. |

Notes:
The line "Binder content" serves merely for information. Binder here means simply the reaction product of hardener H1 and epoxy resin (Chem Res E20). The binder content, accordingly, is the percentage fraction of the binder thus defined as a proportion of the overall system. As an example, the calculation of the binder content for example 1 may be demonstrated: since the reaction of epoxy resin with amine hardener (hardener H1) is a polyaddition without elimination of molecular moieties, the mass fractions of resin and hardener are added to give the amount of the resultant binder: the epoxy resin Chem Res E20 used is taken 100% into account (145.1 g). The hardener H1 used has a solids content of 60%, and hence is taken into account only at 0.6 × 160.0 g = 96.0 g. This gives the amount of binder in the system as 96.0 g + 145.1 g = 241.1 g. The overall system additionally contains 297.6 g of water, giving a total amount of 160 g + 145.1 g + 297.6 g = 602.7 g. The binder fraction in the overall system is produced as follows: % binder = 241.1 × 100/602.7 = 40.00%.
n.d. = not determined
"Density" means the density of the end product, i.e., the density of the polymer foam

What is claimed is:

1. A polymer foam comprising macropores and micropores, the macropores having average cross sections of above 500 nm, wherein the fraction of macropores relative to the entirety of micropores and macropores is above 50% by volume, and wherein the polymer foam is obtained by reacting one or more epoxy resins with one or more amphiphilic epoxy resin hardeners in water in a phase inversion polymerization, wherein, during the phase inversion polymerization, but after phase inversion has taken place, a volume increase of the internal voids which form initially, and which are present predominantly as micropores having average cross sections of below 500 nm, is induced such that the fraction of the macropores—relative to the entirety of micropores and macropores present in the polymer foam—at the end of the phase inversion polymerization is above 50% by volume.

2. The polymer foam of claim 1, wherein the micropores have average cross sections of below 100 nm.

3. The polymer foam of claim 1, wherein the one or more amphiphilic epoxy resin hardeners used are hardeners obtained by reacting a mixture comprising
(A) at least one epoxidized polyalkylene oxide, selected from the group of epoxidized polyethylene oxides, epoxidized polypropylene oxides, and polyethylene-propylene oxides,
(B) at least one epoxidized aromatic hydroxy compound selected from the group of bisphenol A epoxides and bisphenol F epoxides, and
(C) at least one aromatic hydroxy compound selected from the group of bisphenol A and bisphenol F
to give an intermediate, and then reacting this intermediate with a polyamine.

4. The polymer foam of claim 3, wherein the volume increase is induced, during the phase inversion polymerization, but after phase inversion has taken place, by activating a foaming agent and/or heating a liquid medium present in the system to above its boiling point.

5. The polymer foam of claim 3, wherein the volume increase is induced, during the phase inversion polymerization, but after phase inversion has taken place, by heating a liquid medium present in the system to above its boiling point.

6. The polymer foam of claim 5, wherein the liquid medium is the water present in the system.

7. The polymer foam of claim 3, wherein the volume increase is induced, during the phase inversion polymerization, but after phase inversion has taken place, by activating a foaming agent.

8. The polymer foam of claim 7, wherein the foaming agent is hydrogen peroxide or an organic peroxide.

9. The polymer foam of claim 3, wherein diethylenetriamine is used as the polyamine.

10. The polymer foam of claim 3, wherein epoxidized polypropylene oxides are used as the at least one epoxidized polyalkylene oxide.

11. The polymer foam of claim 3, wherein the bisphenol A epoxides are used as the at least one epoxidized aromatic hydroxy compound.

12. A method for insulation in a transport, industrial, or plant construction application, the method comprising:
a) obtaining the polymer foam of claim 1; and
busing installing the polymer foam in the transport, industrial, or plant construction application, wherein the polymer foam is effective as an acoustic insulation material.

13. A method for producing polymer foams having macropores with average cross sections of above 500 nm comprising:
a) reacting one or more epoxy resins with one or more amphiphilic epoxy resin hardeners in water in a phase inversion polymerization reaction, and
b) inducing a volume increase of the internal voids of the micropores which form initially to produce macropores such that the fraction of the macropores with average cross sections of above 500 nm at the end of the phase inversion polymerization is above 50% by volume relative to the entirety of micropores and macropores present in the polymer foam.

14. The method of claim 13, wherein the one or more epoxy resin hardeners are formed by:
a) reacting a mixture comprising at least one epoxidized polyalkylene oxide, at least one epoxidized aromatic hydroxy compound and at least one aromatic hydroxy compound the group of bisphenol A and bisphenol F to produce an intermediate; and
b) reacting said intermediate with a polyamine.

15. The method of claim 14 wherein the at least one epoxidized polyalkylene oxide is selected from the group consisting of epoxidized polyethylene oxides, epoxidized polypropylene oxides, and polyethylene-propylene oxides.

16. The method of claim 14 wherein the at least one epoxidized aromatic hydroxy compound is selected from the group consisting of bisphenol A epoxides and bisphenol F epoxides.

17. The method of claim 14 wherein the at least one aromatic hydroxy compound is selected from the group consisting of bisphenol A and bisphenol F.

18. The method of claim 13 wherein the step of inducing a volume increase during the phase inversion polymerization comprises activating a foaming agent.

19. The method of claim 13 wherein the step of inducing a volume increase during the phase inversion polymerization comprises heating a liquid medium present in the system to above its boiling point.

20. The method of claim 18 wherein the foaming agent is hydrogen peroxide or an organic peroxide.

* * * * *

UNITED STATES PATENT AND TRADEMARK OFFICE
CERTIFICATE OF CORRECTION

PATENT NO.        : 8,598,243 B2                                              Page 1 of 1
APPLICATION NO.   : 13/173939
DATED             : December 3, 2013
INVENTOR(S)       : Birnbach et al.

It is certified that error appears in the above-identified patent and that said Letters Patent is hereby corrected as shown below:

In the Claim

Claim 12, column 14, line 20, "busing installing" should read --b) installing--.

Signed and Sealed this
Twenty-seventh Day of May, 2014

Michelle K. Lee
*Deputy Director of the United States Patent and Trademark Office*